United States Patent [19]

Burow et al.

[11] Patent Number: 4,919,727

[45] Date of Patent: Apr. 24, 1990

[54] NEW OXIDATION RESISTANT, HEAT RESISTANT IRON OXIDE BLACK PIGMENTS, A PROCESS FOR THEIR PREPARATION AND THEIR USE

[75] Inventors: Wilfried Burow, Krefeld; Gerd-Hermann Schulten, Duisburg; Peter Kiemle, Krefeld, all of Fed. Rep. of Germany

[73] Assignee: Bayer Aktiengesellschaft, Leverkusen, Fed. Rep. of Germany

[21] Appl. No.: 303,298

[22] Filed: Jan. 30, 1989

[30] Foreign Application Priority Data

Feb. 10, 1988 [DE] Fed. Rep. of Germany ....... 3803940

[51] Int. Cl.$^5$ .............................................. C04B 14/00
[52] U.S. Cl. ..................................... 106/456; 106/457
[58] Field of Search ................................ 106/456, 457

[56] References Cited

U.S. PATENT DOCUMENTS

| | | | |
|---|---|---|---|
| 4,053,325 | 10/1977 | Vanderheiden | 106/304 |
| 4,620,879 | 11/1986 | Burow et al. | 106/304 |
| 4,631,089 | 12/1986 | Rademachers | 106/456 |
| 4,631,090 | 12/1986 | Nauman | 106/457 |
| 4,698,100 | 10/1987 | Burow et al. | 106/304 |
| 4,773,938 | 9/1988 | Buxbaum | 106/456 |

Primary Examiner—Peter D. Rosenberg
Attorney, Agent, or Firm—Connolly and Hutz

[57] ABSTRACT

Isometric oxidation resistant and heat resistant iron oxide black pigments having a foreign metal content of less than 5 ppm of each of As, Pb and Ba, less than 200 ppm total of Ca, $BaSO_4$, Zn, Sb and Cr and from 0.05 to 2% by weight, calculated as trivalent or tetra-valent oxides, of B, Al, Ga, Si, Ge and Sn, are useful in coloring lacquers, thermoplastic synthetic resins and building materials as well as for low coercivity iron oxide black pigments in magnetic toners.

15 Claims, No Drawings

OXIDATION RESISTANT, HEAT RESISTANT IRON OXIDE BLACK PIGMENTS, A PROCESS FOR THEIR PREPARATION AND THEIR USE

This invention relates to new isometric, heat resistant iron oxide black pigments, and to a process for their preparation and their use.

BACKGROUND OF THE INVENTION

Iron oxide pigments are becoming increasingly important due to the continuously increasing demand for environmentally harmless pigments. To qualify as environmentally harmless pigments, iron oxide pigments should be as far as possible free from trace elements.

Iron oxide black pigments used in the lacquer, plastics and building industry or as magnetic pigments slowly oxidize in the presence of oxygen or air.

As a result of this oxidation, they undergo an undesirable color shift to brown or red shades. In magnetic pigments, the oxidation causes a change in the magnetic properties.

Iron oxide black pigments are also required to be very stable at elevated temperatures, especially when they are used in stoving lacquers.

It is known from German 2,740,861=(U.S. Pat. No. 4,053,325) that iron oxide black pigments may be rendered heat resistant by a surface coating with up to 20% by weight of metal phosphates of the metals Al, Ba, Ca, Mg or Zn.

Such measures, however, are not acceptable where the intensity of color or the magnetic data of the pigment may be impaired by the colorless or non-magnetic coating or where very pure iron oxide black pigments free from coatings are required.

It is an object of the present invention to provide iron oxide black pigments which do not have the disadvantages described above.

BRIEF DESCRIPTION OF THE INVENTION

It has now been found that this requirement is fulfilled by isometric oxidation resistant, heat resistant iron oxide black pigments which are characterized in that they have a foreign metal content of As, Pb and Ba of less than 5 ppm (each).

DETAILED DESCRIPTION

Oxidation resistant and heat resistant isometric iron oxide black pigments free from coating have been discovered which also have a low magnetic coercivity. These iron oxide black pigments have a low foreign metal content. In particular, the pigments contain less than 5 parts per million of each of As, Pb and Ba. These pigments are the subject matter of this invention. In a preferred embodiment, the iron oxide black pigments according to the invention have a foreign metal content of Cu, $BaSO_4$, Zn, Sb and Cr amounting to a total of less than 200 ppm. These iron oxide black pigments are stable in the heat and have a low foreign metal content. They contain B, Al, Ga, Si, Ge and Sn in quantities of a total of only 0.05 to 2% by weight, preferably 0.1 to 1% by weight, calculated as trivalent or tetravalent oxides. In a preferred embodiment, the iron oxide black pigments according to the invention are heat resistant at temperatures above 150° C. and up to 210° C.

The iron oxide black pigments according to the invention have a coercivity of <9,500 A/m, preferably <4,800 A/m. They therefore constitute novel isometric iron oxide black pigments which combine an extremely low content in trace metals with very high heat resistance and resistance to oxidation as well as being particularly suitable as magnetic pigments for certain applications.

Processes for the preparation of isometric iron oxide black pigments or magnetic pigments are known in general, namely the one-step process and the two-step process (Winnacker-Küchler, Volume 2, page 171, Munich 1970) and the iron-(III) chloride process (Japan 56-60789).

A simple, economical method of producing iron oxide black pigments and magnetic pigments free from coatings and with only low foreign metal contents has not hitherto been found.

The novel isometric iron oxide black pigments and magnetic pigments according to the invention which differ from conventional isomeric iron oxide black pigments and magnetic pigments in their heat resistance and low content in trace metals and have exceptionally advantageous coloristic and magnetic properties may surprisingly be obtained by reacting highly cross-linked needle shaped iron oxide yellow pigments with iron-(II) salt solutions.

This invention also relates to a technically simple and at the same time economical process for the production of the isometric iron oxide black pigments according to the invention.

One embodiment of the process according to the invention is characterized in that the formation of $\alpha$-FeOOH nuclei is carried out by the precipitation of iron(II) salts with alkaline substances and oxidation in the presence of compounds of the elements B, Al, Ga, Si, Ge and/or Sn in quantities of from 0.05 to 10% by weight, calculated as trivalent or tetravalent oxides and based on the calculated quantity of precipitated $\alpha$-FeOOH nuclei, pigment formation is carried out by precipitation in the usual manner, the brine is separated from the resulting yellow sludge and the iron oxide yellow paste which has been isolated is converted into the iron oxide black pigment by precipitation with iron-(II) salts, drying and milling.

The iron oxide yellow pastes used for the preparation of the pigments according to the invention are preferably those described in German 3,326,632 (=U.S. Pat. No. 4,620,879 and U.S. Pat. No. 4,698,100) although the yellow preliminary products may also be prepared by the conventional process of iron oxide yellow production. A yellow nucleus is preferably produced in the presence of small quantities of aluminium compounds. A yellow pigment may then be grown on this nucleus.

According to a preferred embodiment of the process of the invention, therefore, aluminium compounds are preferably used in such quantities for the formation of the nucleus that the aluminium oxide content in the iron oxide black pigment is from 0.05 to 2% by weight, preferably from 0.1 to 1.0% by weight.

The iron oxide yellow is synthesized by the method of Penniman in the presence of metallic iron or by the precipitation process or the aniline process. In the precipitation process, iron-(II) sulphate which has been purified by a preliminary precipitation is used as starting material. The iron-(II) sulphate used is preferably a waste liquid of the type obtained from pickling steel or in titanium dioxide factories. The precipitation process of synthesizing iron oxide yellow may be carried out at a constant pH in the region of from 2.8 to 4.5 or with stepwise increase of the pH during formation of the pigment, starting at pH values below 3 and increasing the pH stepwise by 0.1 to 0.2 units per hour to a final value of from 3.8 to 4.5.

The end product of yellow synthesis is a salt-containing yellow sludge which serves as preliminary product for the preparation of the isometric iron oxide black pigments and magnetic pigments and can be worked up into these pigments according to the invention by a particularly simple, economical process.

The salt liquor is first separated from the sludge, which contains about 30 to 70 g/l of iron oxide yellow and a salt liquor, and the yellow sludge is concentrated. Separation of the salt liquor from the highly branched, needle shaped preliminary product is preferably carried out by sedimentation since the highly branched iron oxide yellow pigment sediments 20 times more quickly than conventional iron oxide yellow such as, for example, Bayferrox ®920, trade product of Bayer AG. The supernatant liquor containing salt may be pumped off after a sedimentation time of 3 hours. A yellow paste with only a low salt content is left in the sedimentation container and is then thickened to an iron oxide yellow content of more than 200 g/l by sedimentation.

This yellow sludge, which may have a concentration, for example, of 250 g/l, is much more fluid and can be pumped more easily than yellow pastes of conventional iron oxide yellow pigments of the same concentration. Conventional yellow sludges can only be handled up to a concentration of about 100 g/l. At high concentrations, the viscosity of conventional yellow pastes rises to such a level that they are relatively non-fluid and difficult to pump and react only slowly and incompletely in the subsequent reaction with iron-(II) salts.

In one particularly economical variation of the process according to the invention, highly fluid and easily pumped yellow sludges having a concentration of iron oxide yellow of more than 200 g/l, preferably ≧250 g/l, are used for precipitation of the yellow sludge with iron-(II) salts.

Due to the high concentration of the yellow preliminary product, from 2 to 2.5 times the quantity of pigment is obtained per unit time from the reaction in the reaction vessel, compared with the quantity obtained by the conventional methods of employing the one stage, two stage or iron-(III) chloride process.

This yellow preliminary product may then be further reacted to isometric iron oxide black pigment. If conventional iron oxide yellow is used as preliminary product for this reaction, the advantage of the high pigment yield is not obtained. The reaction product consisting of the salt-containing black sludge is washed until salt free in the usual manner, dried and ground. For further processing the black sludges, the man of the art has a wide choice of apparatus available for washing, filtration, drying and grinding of the iron oxide black pigment.

Because of their advantageous properties, namely their purity, resistance to oxidation, stability under heat, high intensity of color and blue tinge, the iron oxide black pigments according to the invention are very suitable as environmentally harmless pigments for coloring lacquers, thermoplastic resins and building materials, and particularly also for use in stoving lacquers.

Also because of their purity, the pigments according to the invention are also suitable as environmentally harmless magnetic pigments of low coercivity (Table 6). The invention therefore also relates to the use of the pigments as low coercivity, environmentally harmless iron oxide black pigments in toners.

The invention is described below with the aid of examples which, however, are not to be regarded as limiting the invention.

In the following examples, the heat resistance of the pigments according to the invention is determined in the methods described below by subjecting the pigment to a heat treatment in a circulating air drying cupboard. The quantity of sample in the procelain crucible should be 25 g and the residence time at the test temperature should be 30 minutes. 140° C. is chosen as the lowest test temperature and the temperature is raised at intervals of 20° C. The temperature at which the pigment being tested first undergoes a marked color change is noted. The sample which has been dried at 105° C. is used as reference. The color tones of all the heat treated samples are determined according to DIN 6174 (equivalent ISO/DIN 7724, 1-3 drafts) at a pigment volume concentration of 10% in the binder Alkydal F48, trade product of Bayer AG, which is a medium oily alkydal resin. Since a color change of the pigment is not required, the color differences ˆb* of the pigment samples is calculated against the reference according to DIN 6174. The test temperature, rounded off to the nearest 5° C., at which the color difference obtained for the pigment is ˆb*=1 compared with the reference is a measure of the heat resistance of the pigment. A positive value for ˆb* compared with the reference corresponds to an undesirable brown discoloration of the pigment.

Table 7 contains the temperatures in °C., obtained by graphic interpolation, at which the color difference ˆb*=1. The iron oxide black pigments prepared according to the invention are distinguished b exceptionally advantageous coloristic properties. The properties desired are high intensity of color and high blue tinge (negative ˆb*) compared with the reference. The color values of the pigments were determined in the lacquer Alkydal ® F48 (trade product of Bayer AG) mixed with titanium dioxide R KB2 ® (trade product of Bayer AG) in proportions by weight of 90:10=TiO$_2$:Fe$_3$O$_4$ at a pigment concentration of 10% according to DIN 6174 (equivalent ISO/DIN 7724, 1-3 drafts) CIELAB C/2 grd.

Table 8 contains the trace content of iron oxide black pigments in terms of ppm, based on weight.

EXAMPLE 1

20.0 m$^3$ of Bayferrox ®—920 Z—Suspension (c=91.6 g of FeOOH/l) and 1426 l of NaOH solution (c=18.8 M/l) were heated to 75° C. with stirring and 8650 l of FeSO$_4$ solution (c=235.2 g of FeSO$_4$/l) were pumped in over a period of 2 hours with further stirring. The temperature was then raised to 95° C. and kept at 95° C. at a pH of 7.3±0.5 for 2 hours with stirring. The pigment suspension was washed until salt free and filtered and the filter cake was dried to constant weight and the dry substance was ground.

EXAMPLE 2

1071 ml of Bayferrox ®—920 Z—Suspension (c=83.1 g of FeOOH/l) were treated to 95° C., and 412 ml of FeSO$_4$ solution (c=240 g/l) were added. 279 ml of NaOH solution (c=4.75 M/l) were added over a period of 20 minutes at 95° C. with stirring and the suspension was then kept at 95° C. for a further 2 hours with stirring.

After the pigment had been washed until free from salt, it was filtered off, dried and ground.

Table 1 shows the tinting strength (F rel) and color shade data (^b*) under conditions of brightening up by comparison with Bayferrox ® pigments, and the specific surface areas (according to BET) of the pigments are also entered.

TABLE 1

| Example | Reference Bayferrox ® | Coloristic F rel | ^a* | ^b* | BET Surface Area (m² × g⁻¹) |
|---|---|---|---|---|---|
| 1 | 320 | 66% | −0.9 | −2.2 | 4.2 |
| 2 | 320 | 153% | −0.5 | −1.3 | 8.0 |

EXAMPLES 3 TO 7

62.0 m³ of commercial FeSO$_4$ solution (c=201.0 g of FeSO$_4$/l) and 2,215 l of Al$_2$(SO$_4$)$_3$ solution (c=1.00 M/l) were heated to 50° C. with stirring. After the mixture had been heated up, 9.40 m³ of commercial sodium hydroxide solution (c=9.50 M/l) were pumped in and the reaction mixture was oxidised with 700 m³ air/h at 50° to 55° C. with stirring until the pH was 2.8.

80 m³ of water were added to 36.0 m³ of this yellow nuclear suspension, and 70.6 m³ of sodium hydroxide solution (c=5.00 M/l) and 117 m³ of FeSO$_4$ solution (c=201.0 g of FeSO$_4$/l) were added at 75° to 80° C. with stirring and gassing with 700 m³ air/h over a period of about 44 hours so that the pH in the suspension rose by 0.1 to 0.2 units per hour to a pH of 3.8 and was then kept constant at 4.0±0.2.

The yellow nuclear suspension was washed until salt free and thickened by sedimentation.

4530 ml of yellow nuclear suspension (c=265 g of pigment/l) were heated to x° C., 3,300 ml of NaOH solution (c=4.75 M/l) were added, and FeSO$_4$ solution (c=240 g/l) was then pumped in with a dosing pump in about y minutes with stirring at x° C. until a pH of 7.3±0.5 was obtained.

The suspension was heated to 95° C. while the pH was maintained at 7.3±0.5 and was then stirred for some time at this temperature and at a pH of 7.3±0.5. The iron oxide black pigment obtained was washed until salt free, filtered, dried and ground.

The precipitation temperatures (x° C.), the FeSO$_4$ dosing time (y min), the specific surfaces (according to BET) and the coloristic data (relative tinting strength F rel, ^a* and ^b*) under brightened conditions by comparison with Bayferrox ® pigments are summarised in Table 2.

TABLE 2

| Example | Precipitation Temperature x° C. | Dosing Time y min | BET (m²·g⁻¹) | Reference Bayferrox ® | F rel | ^a* | ^b* |
|---|---|---|---|---|---|---|---|
| 3 | 90 | 350 | 2.6 | 320 | 33% | −1.1 | −1.8 |
| 4 | 90 | 90 | 4.4 | 320 | 66% | −0.9 | −1.9 |
| 5 | 90 | 45 | 6.8 | 320 | 90% | −1.1 | −2.3 |
| 6 | 25 | 45 | 5.5 | 320 | 120% | −1.0 | −2.0 |
| 7 | 60 | 45 | 5.8 | 320 | 92% | −1.1 | −1.8 |

EXAMPLES 8 TO 11

(1) 3740 ml of NaOH solution (c=4.75 M/l) and (2) FeSO$_4$ solution were added simultaneously with two dosing pumps at a feed rate of 12 liters per hour each at x° C. to 4530 ml of the yellow pigment suspension (c=265 g of pigment/l) from Examples 3 to 7 until a pH of y was obtained. The temperature of the suspension was then raised to 95° C. and the suspension was stirred at this temperature for a further 2 hours while the value of pH=y was kept constant. The pigments were worked up in the usual manner.

The precipitation temperature x° C., the pH y, the specific surface area (BET) and the coloristic data of brightening compared to Bayferrox ® 320 are shown in Table 3.

TABLE 3

| Example | Precipitation Temperature x° C. | pH y | BET (m²·g⁻¹) | Reference Bayferrox ® | F rel | ^a* | ^b* |
|---|---|---|---|---|---|---|---|
| 8 | 25 | 9.0 ± 0.5 | 6.9 | 320 | 172% | −0.5 | −1.0 |
| 9 | 25 | 10.0 ± 0.5 | 6.2 | 320 | 157% | −0.6 | −1.8 |
| 10 | 60 | 9.0 ± 0.5 | 6.4 | 320 | 151% | −0.7 | −2.0 |
| 11 | 60 | 10.0 ± 0.5 | 4.0 | 320 | 92% | −1.0 | −2.7 |

EXAMPLES 12 TO 13

7,400 liters of sodium hydroxide solution (c=7.82 M/l) and 1,310 liters of sodium aluminate solution (c=3.0 mol Al$_2$O$_3$/l and 9.05 mol NaOH/l) were pumped into 67.0 m³ of FeSO$_4$ solution (c=151.3 g of FeSO$_4$/l) at 40° C. with stirring and the reaction mixture was then oxidised with 750 m³ of air/h with stirring until the pH obtained was ≦2.8.

60.0 m³ of this yellow nuclear suspension was diluted to 120 m³ with water and the suspension was heated to 75° C.

70.0 m³ of sodium hydroxide solution (c=7.82 M/l) and 210 m³ of FeSO$_4$ solution (c=201 g of FeSO$_4$/l) were added at 75° to 80° C. with stirring and gassing with 700 m³ of air/h over a period of about 48 hours so that the pH of the suspension rose by 0.1 to 0.2 units per hour to pH=3.8 and then remained constant at 4.0±0.2.

The yellow suspension was washed until free from salt and concentrated by sedimentation.

4,100 ml of NaOH solution (c=4.75 M/l) were added to 4,445 ml of this yellow nuclear suspension (c=270 g of pigment/l) at x° C. and FeSO$_4$ solution (c=241.7 g/l) was added at a feed rate of 12.0 l/h at x° C. with stirring until a pH of 7.0±0.2 was obtained. The temperature was then adjusted to 95° C. and stirring was continued for a further 2 hours at 95° C. and pH=7.0±0.2.

Working up of the suspension was carried out as in the previous examples.

The precipitation temperature, the specific surface areas, (according to BET) and the coloristic data of brightening of the pigments compared with Bayferrox ® 320 are entered in Table 4.

TABLE 4

| Example | Precipitation Temperature x° C. | BET (m²·g⁻¹) | Coloristic Properties Reference Bayferrox ® | F rel | ^a* | ^b* |
|---|---|---|---|---|---|---|
| 12 | 25 | 8.3 | 320 | 112% | −1.0 | −1.9 |
| 13 | 60 | 8.1 | 320 | 91% | −1.1 | −2.0 |

EXAMPLES 14 TO 17

4,445 ml of the yellow pigment suspension from Examples 12 and 13 (c=270 g of pigment/l) adjusted to x° C. and 3,840 ml of NaOH solution (c=4.75 M/l) and FeSO₄ solution (c=240.0 g/l) added simultaneously with stirring at this temperature by means of dosing pumps each delivering at the rate of 12.0 l/h until a pH of 7.0±0.2 was obtained. After increase of the temperature to 95° C., stirring for a further 2 hours at this temperature and at pH=7.2±0.2. The suspension was worked up in the usual manner.

Table 5 shows the precipitation temperatures x° C., the specific surface areas (according to BET) and the coloristic data of brightening of the pigments in comparison with Bayferrox ® 320.

TABLE 5

| Example | Precipitation Temperature x° C. | BET (m²·g⁻¹) | Coloristic Properties Reference Bayferrox ® | F rel | ^a* | ^b* |
|---|---|---|---|---|---|---|
| 14 | 25 | 11.0 | 320 | 198% | −0.2 | −0.1 |
| 15 | 60 | 8.4 | 320 | 154% | −0.7 | −1.8 |
| 16 | 80 | 5.8 | 320 | 134% | −0.8 | −2.2 |
| 17 | 90 | 5.6 | 320 | 132% | −0.8 | −2.0 |

TABLE 6

Coercivity $_iH_c$ (A/m) and saturation (tesla m³/g) of iron oxide black pigments prepared according to the invention (measured on powder at field strength of 79.6 KA/m and 278.5 KA/m).

| | Field strength | | | |
|---|---|---|---|---|
| | 79.6 KA/m | | 278.5 KA/m | |
| Example | $I^{H}c$ (A/m) | Tesla m³/g | $I^{H}c$ (A/m) | Tesla m³/g |
| 6 | 3900 | 89965 | 4138 | 105504 |
| 8 | 8196 | 87965 | 8435 | 102992 |
| 12 | 2706 | 85451 | 2785 | 101736 |
| 15 | 5650 | 89221 | 5809 | 106760 |
| 17 | 9231 | 81681 | 9470 | 100480 |

TABLE 7

Specific surface area (according to BET) and thermostability of Bayferrox ® 330 and iron oxide black pigments prepared according to the invention.

| Product | BET Surface Area (m²·g⁻¹) | Thermostability (°C.) |
|---|---|---|
| Bayferrox ® 330 | 16.0 | 160 |
| Example 1 | 4.2 | 190 |
| 4 | 4.4 | 190 |
| 5 | 6.8 | 200 |
| 6 | 5.5 | 190 |
| 12 | 8.3 | 190 |
| 15 | 8.4 | 190 |

TABLE 8

| Trace element content of iron oxide black pigments and magnetic pigments | | | | | | | | | | | | | | |
|---|---|---|---|---|---|---|---|---|---|---|---|---|---|---|
| | As | Pb | Ba | Hg | Cu | BaSO₄ | Zn | Sb | Cr | Cd | Sn | U | Se | Te | Tl |
| Product | | | | | | (ppm) | | | | | | | | | |
| Example 2 | <3 | <5 | <2 | <1 | 26 | <5 | 71 | <1 | 38 | <1 | <1 | <5 | <1 | <1 | <1 |
| Example 15 | <1 | <5 | <2 | <1 | 14 | <5 | 40 | <1 | 25 | <1 | <1 | <5 | <1 | <1 | <1 |

What is claimed is:

1. Isometric oxidation resistant and heat resistant iron oxide black pigments having a foreign metal content of less than 5 parts per million of each of As, Pb and Ba.

2. Iron oxide black pigments according to claim 1, having a foreign metal content of Cu, BaSO₄, Zn, Sb and Cr amounting to a total of less than 200 ppm.

3. Iron oxide black pigments according to claim 1 which contain B, Al, Ga, Si, Ge and Sn in quantities of from 0.05 to 2% by weight, calculated as trivalent or tetra-valent oxides.

4. Iron oxide black pigments according to claim 3 which contain B, Al, Ga, Si, Ge and Sn in quantities of from 0.1 to 1% by weight, calculated as trivalent or tetra-valent oxides.

5. Iron oxide black pigments according to claim 1 which are heat resistant at temperatures from 150° C. to 210° C.

6. Iron oxide black pigments according to claim 1 which have a coercivity of less than 9,500 A/m.

7. Iron oxide black pigments according to claim 6 which have a coercivity of less than 4,800 A/m.

8. Process for the preparation of iron oxide black pigments according to claim 1 which comprises forming α-FeOOH nuclei by the precipitation of iron (II) salts with alkaline substances with oxidation in the presence of compounds of one or more of the elements B, Al, Ga, Si, Ge and Sn in quantities of from 0.1 to 10% by weight calculated as trivalent or tetravalent oxides and based on the calculated quantity of precipitated α-FeOOH nuclei, precipitating iron oxide onto the nuclei until a yellow iron oxide pigment suspension is obtained, separating and removing the aqueous liquor from the suspension to obtain a resulting yellow sludge and then converting the isolated iron oxide yellow sludge paste into iron oxide black pigment by precipitation with iron-(II) salts followed by drying and grinding.

9. Process according to claim 8 wherein formation of the nuclei is achieved by precipitation in the presence of an aluminum compound in such quantities that the aluminum oxide content of the iron oxide black pigment product is from 0.05 to 2% by weight.

10. Process according to claim 9 wherein the amount of aluminum compound present in formation of the nuclei is such that the aluminum content of the iron oxide black pigment product is 0.1 to 1% by weight.

11. Process according to claim 8 wherein separation of the yellow sludge from the aqueous liquor is carried out by sedimentation.

12. Process according to claim 8 wherein precipitation of the yellow sludge with iron (II) salts is carried out with readily flowing and pumpable yellow sludges having a concentration of more than 250 g/l of iron oxide yellow.

13. In an improved method of coloring lacquers, thermoplastic synthetic resins or building materials by incorporating therein pigmenting material, the improvement comprises said pigmenting material being an iron oxide black pigment according to claim 1.

14. Colored lacquers thermoplastic synthetic resins or building materials which contain a color-imparting amount of an iron oxide black pigment according to claim 1.

15. An improved magnetic toner composition which contains as a pigment low coercivity iron oxide black pigment according to claim 1.

* * * * *